(12) United States Patent
Usui (10) Patent No.: US 6,342,974 B1
(45) Date of Patent: Jan. 29, 2002

(54) ZOOM LENS AND PHOTOGRAPHING APPARATUS

(75) Inventor: Fumiaki Usui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/684,908

(22) Filed: Oct. 10, 2000

(30) Foreign Application Priority Data

Oct. 14, 1999 (JP) ............................................. 11-292620
Oct. 4, 2000 (JP) ........................................... 12-304843

(51) Int. Cl.$^7$ ............................................... G02B 15/14
(52) U.S. Cl. ........................ 359/687; 359/686; 359/685; 359/684; 359/715; 359/714
(58) Field of Search ................................ 359/684, 685, 359/686, 687, 688, 676, 714, 715

(56) References Cited

U.S. PATENT DOCUMENTS

| | | | |
|---|---|---|---|
| 4,110,006 A | * 8/1978 | Ikemori | 359/684 |
| 4,752,121 A | * 6/1988 | Kitagishi | 359/687 |
| 5,272,564 A | * 12/1993 | Suzuki et al. | 359/676 |
| 5,572,276 A | * 11/1996 | Hirakawa | 359/684 |
| 5,737,128 A | 4/1998 | Usui | 359/686 |
| 5,745,300 A | 4/1998 | Usui et al. | 359/684 |
| 5,986,820 A | 11/1999 | Usui et al. | 359/684 |
| 5,995,296 A | 11/1999 | Usui | 359/684 |
| 5,995,297 A | 11/1999 | Usui | 359/684 |
| 6,124,982 A | 9/2000 | Usui | 359/686 |

FOREIGN PATENT DOCUMENTS

JP        7-43611        2/1995

* cited by examiner

Primary Examiner—Evelyn A Lester
(74) Attorney, Agent, or Firm—Fitzpatrick, Cella, Harper & Scinto (57) ABSTRACT

A zoom lens includes, in order from an object side to an image side, a first lens unit of positive refractive power, a second lens unit of negative refractive power arranged to move during variation of magnification, a third lens unit arranged to move during variation of magnification, and a fourth lens unit of positive refractive power. The first lens unit includes a first lens subunit arranged to be stationary during focusing, and a second lens subunit of positive refractive power arranged to move during focusing. The first lens subunit includes, in order from the object side to the image side, at least one first positive lens, at least one negative lens of bi-concave form, and at least one second positive lens.

8 Claims, 5 Drawing Sheets

FIG. 1

FIG. 2 f = 10.00~660.00    Fno = 1:1.8~3.3    2ω = 57.6°~0.95°

| | | | |
|---|---|---|---|
| r 1= 582.076 | d 1= 19.31 | n 1= 1.49845 | ν 1= 81.5 |
| r 2= -699.740 | d 2= 1.00 | | |
| r 3= -699.740 | d 3= 5.00 | n 2= 1.80401 | ν 2= 42.2 |
| r 4= 353.870 | d 4= 2.01 | | |
| r 5= 396.579 | d 5= 24.12 | n 3= 1.43496 | ν 3= 95.1 |
| r 6= -616.991 | d 6= 18.75 | | |
| r 7= 280.427 | d 7= 22.68 | n 4= 1.43496 | ν 4= 95.1 |
| r 8= -3987.328 | d 8= 0.25 | | |
| r 9= 245.228 | d 9= 20.61 | n 5= 1.43496 | ν 5= 95.1 |
| r10= 2602.162 | d10= 0.25 | | |
| r11= 179.562 | d11= 11.35 | n 6= 1.49845 | ν 6= 81.5 |
| r12= 279.314 | d12= Variable | | |
| r13= 268.944 | d13= 2.00 | n 7= 1.82017 | ν 7= 46.6 |
| r14= 58.663 | d14= 6.78 | | |
| r15= -167.962 | d15= 1.90 | n 8= 1.75844 | ν 8= 52.3 |
| r16= 124.304 | d16= 5.43 | | |
| r17= -87.283 | d17= 1.90 | n 9= 1.82017 | ν 9= 46.6 |
| r18= 73.008 | d18= 10.05 | n10= 1.93306 | ν10= 21.3 |
| r19= -79.581 | d19= 1.09 | | |
| r20= -75.798 | d20= 2.20 | n11= 1.88815 | ν11= 40.8 |
| r21= 295.867 | d21= Variable | | |
| r22= 300.546 | d22= 10.26 | n12= 1.59446 | ν12= 68.3 |
| r23= -129.390 | d23= 0.20 | | |
| r24= 213.995 | d24= 10.66 | n13= 1.48915 | ν13= 70.2 |
| r25= -157.026 | d25= 3.04 | | |
| r26= -99.893 | d26= 2.50 | n14= 1.72538 | ν14= 34.7 |
| r27= -126.735 | d27= 0.20 | | |
| r28= 118.088 | d28= 2.50 | n15= 1.85501 | ν15= 23.9 |
| r29= 62.493 | d29= 0.12 | | |
| r30= 61.014 | d30= 14.10 | n16= 1.49845 | ν16= 81.5 |
| r31= -6767.690 | d31= 0.20 | | |
| r32= 127.098 | d32= 6.95 | n17= 1.48915 | ν17= 70.2 |
| r33= -9031.175 | d33= Variable | | |
| r34= (Stop) | d34= 4.50 | | |
| r35= -76.206 | d35= 1.80 | n18= 1.82017 | ν18= 46.6 |
| r36= 57.329 | d36= 0.20 | | |
| r37= 37.532 | d37= 5.70 | n19= 1.81643 | ν19= 22.8 |
| r38= 143.612 | d38= 4.97 | | |
| r39= -56.408 | d39= 2.00 | n20= 1.88815 | ν20= 40.8 |
| r40= 91.618 | d40= 30.04 | n21= 1.81264 | ν21= 25.4 |
| r41= -451.779 | d41= 5.50 | | |
| r42= -778.121 | d42= 6.39 | n22= 1.62286 | ν22= 60.3 |
| r43= -82.192 | d43= 0.20 | | |
| r44= -385.987 | d44= 2.10 | n23= 1.83932 | ν23= 37.2 |
| r45= 52.980 | d45= 8.31 | n24= 1.62286 | ν24= 60.3 |
| r46= -48.784 | d46= 0.20 | | |
| r47= 228.661 | d47= 8.78 | n25= 1.48915 | ν25= 70.2 |
| r48= -38.133 | d48= 2.10 | n26= 1.83932 | ν26= 37.2 |
| r49= -104.874 | d49= 0.20 | | |
| r50= 82.711 | d50= 6.22 | n27= 1.62286 | ν27= 60.3 |
| r51= -1012.777 | d51= 2.00 | | |
| r52= 0.000 | d52= 55.50 | n28= 1.51825 | ν28= 64.2 |
| r53= 0.000 | | | |

FIG. 3

| VARIABLE SEPARATION | FOCAL LENGTH | | | | |
|---|---|---|---|---|---|
| | 10.00 | 24.88 | 66.68 | 360.00 | 660.00 |
| d 12 | 2.10 | 72.10 | 117.10 | 153.41 | 159.65 |
| d 21 | 245.65 | 166.54 | 107.57 | 31.63 | 3.29 |
| d 33 | 3.50 | 12.61 | 26.59 | 66.22 | 88.32 |

FIG.4A
FNO/1.8
e-LINE, g-LINE

SPHERICAL ABERRATION

FIG.4B
ω=28.8°
ΔM, ΔS

ASTIGMATISM

FIG.4C
ω=28.8°

DISTORTION (%)

FIG.4D
ω=28.8°
g-LINE

LATERAL CHROMATIC ABERRATION (g-LINE)

FIG.5A
FNO/1.8
e-LINE, g-LINE

SPHERICAL ABERRATION

FIG.5B
ω=12.5°
ΔM, ΔS

ASTIGMATISM

FIG.5C
ω=12.5°

DISTORTION (%)

FIG.5D
ω=12.5°
g-LINE

LATERAL CHROMATIC ABERRATION (g-LINE)

FIG.6A
FNO/1.8
e-LINE, g-LINE

SPHERICAL ABERRATION

FIG.6B
ω=4.7°
ΔM, ΔS

ASTIGMATISM

FIG.6C
ω=4.7°

DISTORTION (%)

FIG.6D
ω=4.7°
g-LINE

LATERAL CHROMATIC ABERRATION (g-LINE)

FIG. 9

ZOOM LENS AND PHOTOGRAPHING APPARATUS

BACKGROUND OF THE INVENTION

1. Field of the Invention

The present invention relates to a zoom lens, and more particularly to a zoom lens suited for a television camera, a video camera, a photographic camera, etc., and a photographing apparatus having the zoom lens.

2. Description of Related Art

Heretofore, in telephoto zoom lenses to be used outdoors, such as at a sports ground, among zoom lenses for television cameras or the like, there has been a demand for one that has the entire lens system reduced in size and that has a large aperture ratio, a high variable magnification ratio, and high optical performance. A zoom lens for the type in which focusing (adjustment of focus) is effected by moving a lens unit disposed on the object side of a variator lens unit has such characteristic features that, since zooming (variation of magnification) and focusing can be effected independent of each other, the mechanism for moving the lens units can be simplified, and, since the position of focus is not shifted due to zooming, focusing can be effected by a given amount of drawing-out movement with respect to a given object distance irrespective of the position of zooming.

Among such zoom lenses, in the so-called four-unit zoom lenses, each of which comprises, in order from the object side to the image side, a first lens unit (front lens unit) of positive refractive power for focusing, a second lens unit (variator lens unit) of negative refractive power for the variation of magnification, a third lens unit (compensator lens unit) of positive refractive power for compensating for the shift of an image plane due to the variation of magnification, an aperture shop, and a fourth lens unit (relay lens unit) of positive refractive power for image formation, the one that adopts the so-called inner focusing method, in which focusing is effected by moving a part of the first lens unit, has been disclosed in, for example, Japanese Laid-Open Pat. Application No. Hei 7-43611. In the four-unit zoom lens disclosed in Japanese Laid-Open Pat. Application No. Hei 7-43611, the first lens unit is divided into a plurality of lens subunits, and a lens subunit disposed closest to the object side in the plurality of lens subunits is made stationary during focusing, and a lens subunit disposed behind or on the image side of the lens subunit disposed closest to the object side is moved during focusing, so that the inner focusing method is adopted.

In general, a zoom lens of the inner focusing type has such characteristic features that the effective diameter of the first lens unit is smaller than that in a zoom lens in which focusing is effected by moving the whole first lens unit, so that it becomes easy to reduce the size of the entire lens system and it becomes easy to perform close-up photography, particularly, ultra-close-up photography, and, since focusing is effected by moving a relatively small and light lens subunit, a small driving force is sufficient for moving the lens subunit, so that rapid focusing is possible.

In order to make a zoom lens have a large aperture ratio (for example, the F-number being 1.8 to 3.3 or thereabout), a high variable magnifiction ratoi (for example, the variable magnification ration being 60x or more), and high optical performance over the entire variable magnification range and the entire focusing range, it is necessary to appropriately set the refractive power (optical power) of each lens unit, the lens construction, the sharing of achromatrism, etc.

In general, in order to obtain high optical performance with less variation of aberration over the entire variable magnification range and the entire focusing range, it becomes necessary to lessen the amount of aberration occuring at each lens unit by decreasing the power of each lens unit or increasing the degree of freedom for correction of aberration by increasing the number of constituent lens elements of each lens unit. Therefore, if it is intended to attain a zoom lens having a large aperture ratio and a high variable magnification, ratio, the air separation between the respective adjacent lens units becomes large inevitably or the number of lens elements increases inevitably, so that the problem arises that the entire lens system becomes heavy, thick, long and large. In addition, in order to obtain high optical performance over the entire zooming range and the entire focusing range in a high-definition broadcasting system, such as High-Vision, it is necessary to suppress the variation of aberration due to the zooming on the telephoto side or due to focusing. In particular, the variation of longitudinal chromatic aberration or lateral chromatic aberration or the absolute value itself of the amount of aberration must be suppressed as much as possible so as to obtain high resolution. At the same time, in such a telephoto zoom lens that the focal length at the telephoto end of the entire zoom lens system reaches sixty times the size of a photographic effective image plane, the manufacturing tolerance of the first lens unit (front lens unit) becomes strict, so that it becomes very difficult to attain the final optical performance as products. performance over the entire zooming range and the entire focusing range in a high-definition broadcasting system, such as High-Vision, it is necessary to suppress the variation of aberration due to the zooming on the telephoto side or due to the focusing. In particular, the variation of longitudinal chromatic aberration or lateral chromatic aberration or the absolute value itself of the amount of aberration must be suppressed as much as possible so as to obtain high resolution. At the same time, in such a telephoto zoom lens that the focal length at the telephoto end of the entire zoom lens system reaches sixty times the size of a photographic effective image plane, the manufacturing tolerance of the first lens unit (front lens unit) becomes strict, so that it becomes very difficult to attain the final optical performance as products.

In a zoom lens of the inner focusing type in which the first lens unit is divided into a plurality of lens subunits, and a lens subunit disposed on the most object side in the plurality of lens subunits is made stationary during focusing, and a lens subunit disposed behind or on the image side of the lens subunit disposed on the most object side is moved during focusing, as disclosed in the above-mentioned Japanese Laid-Open Pat. application No. Hei 7-43611, the stationary lens subunit is composed of at least one negative lens and at least one positive lens, and aberration occuring in the front lens unit is made to diverge by that negative lens. In such lens surfaces, as to the diverge aberration occuring in the front lens unit, particularly, a lens surface on the image side of the negative lens and a lens surface on the object side of the positive lens, the action of the diverging aberration occuring in the front lens unit is given very large weight. In such lens surfaces as to diverge aberration occurring in the front lens unit, particularly, a lens surface on the image side of the negative lens and a lens surface on the object side of the positive lens, the action of diverging aberration occurring in the front lens unit is given very large weight.

Therefore, in such a telephoto zoom lens that the focal length at the telephoto end of the entire zoom lens system reaches sixty times the size of a photographic effective image plane, when the radius of curvature of each of a lens surface on the image side of the negative lens and a lens surface on the object side of the positive lens becomes small with respect to the focal length at the telephoto end, the negative lens and the positive lens become the so-called effective lens whose manufacturing tolerance has a great influence on the final optical performance. Thus, there may be a possibility that the manufacturing tolerance in the radius of curvature, the lens thickness, the air separation, the refractive index, etc., of the stationary lens subunit of the front lens unit becomes strict, thereby making it difficult to manufacture such a stationary lens subunit.

In order to avoid the above possibility, it is necessary to cause the divergence of aberration occurring in the front lens unit to be shared by a plurality of portions without being concentrated on the stationary lens subunit only. Accordingly, if a concave lens is added to the focusing lens unit to diverge aberration, it becomes possible to decrease the amount of sharing of the stationary lens subunit for the correction of aberration, thereby greatly mitigating the manufacturing tolerance of the stationary lens subunit. However, in such a telephoto large-aperture zoom lens that the focal length at the telephoto end of the entire zoom lens system reaches sixty times the size of a photographic effective image plane, and the F-number at the telephoto end is 3.3 or thereabout, if a concave lens is added to the focusing lens unit to diverge aberration, the weight of the focusing lens unit increases remarkably, so that it becomes difficult to perform rapid focusing.

Therefore, particularly, in a telephoto zoom lens, the way in which the first lens unit (front lens unit) is composed, which greatly participates in the correction of aberration on the telephoto side or aberration due to focusing, becomes an important factor.

BRIEF SUMMARY OF THE INVENTION

It is an object of the invention to provide a zoom lens having a large aperture ratio and a high variable magnification ratio and having high optical performance over the entire variable magnification range and the entire focusing range while adopting the four-unit zoom lens construction of the inner focusing type.

To attain the above object, in accordance with an aspect of the invention, there is provided a zooom lens, comprising, in order from an object side to an iamge side, a first lens unit of positive refractive power, a second lens unit of negative refractive power arranged to move during a variation of magnification, a third lens unit arranged to move during a variation of magnification, and a fourth lens unit of positive refractive power, wherein the first lens unit includes a first lens subunit arranged to be stationary during focusing, and wherein the first lens subunit includes, in order from the object side to the image side, at least one first positive lens, at least one negative lens of bi-concave form, and at least one second positive lens.

Further, in accordance with a preferred aspect of the invention, in the zoom lens, the following conditions are satisfied:

$1.75 < nd$ $60 < vp11f$ $90 < vp11r$ where nd is a refractive index of the negative lens relative to d-line, and vp11f and vp11r are Abbe numbers of the first positive lens and the second positive lens, respectively.

Further, in accordance with a preferred aspect of the invention, in the zoom lens, the following condition is satisfied:

$Pg,d < 1.36 - 0.00208 \times vn11$ provided that $Pg,d=(ng-nd)/(nF-nC)$, where ng, nF and nC are refractive indices of the negative lens relative to g-line, F-line and C-line, respectively, and vn11 is an Abbe number of the negative lens.

Further, in accordance with a preferred aspect of the invention, in the zoom lens, the following condition is satisfied:

$60 < vp12$ where vp12 is a mean value of Abbe numbers of all positive lenses constituting the second lens subunit.

Further, in accordance with a preferred aspect of the invention, in the zoom lens, the second lens subunit consists of a plurality of positive lenses.

Further, in accordance with a preferred aspect of the invention, in the zoom lens, the following condition is satisfied:

$70 < vp31$ where vp31 is an Abbe number of at least one positive lens among positive lenses constituting the third lens unit.

Further, in accordance with a preferred aspect of the invention, in the zoom lens, the image forming magnification of the second lens unit changes within a range including $-1\times$ during a variation of magnification, the third lens unit has a positive refractive power, the image forming magnification of the third lens unit changes within a range including $-1\times$ during variation of magnification, and the following conditions are satisfied:

$55 < fT/IS$ $1.0 < FN1$ provided that $FN1=f1/(fT/FNT)$ $10 < Z2$ $0.17 < Z2/Z$ where fT and FNT are the focal length and F-number at a telephoto end of the zoom lens, respectively, f1 is the focal length of the first lens unit, IS is the size of a photographic effective image plane, Z is a zoom ratio of the zoom lens, and Z2 is the rate of change of lateral magnification of the second lens unit.

The above and further objects and features of the invention will become apparent from the following detailed description of a preferred embodiment thereof taken in conjunction with the accompanying drawings.

BRIEF DESCRIPTION OF THE SEVERAL VIEWS OF THE DRAWING

FIG. 2 is a table showing the numerical example of the invention.

DETAILED DESCRIPTION OF THE INVENTION

Hereinafter, a preferred embodiment of the invention will be described in detail with reference to the drawings.

Figure 1:
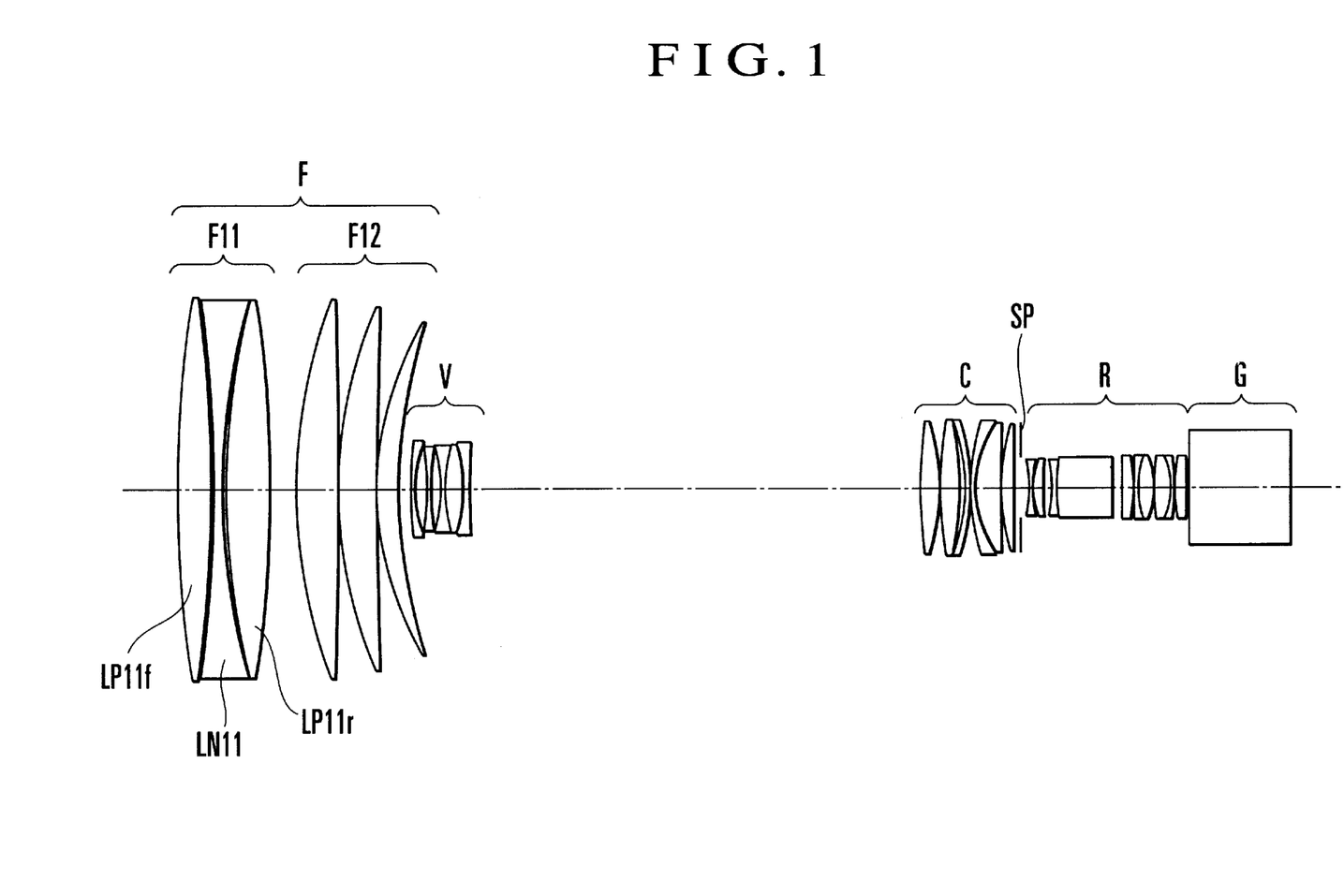
FIG. 1 is a lens block diagram showing a zoom lens at the wide-angle end according to a numerical example of the invention.

FIG. 1 is a lens block diagram showing a zoom lens at the wide-angle end according to a numerical example of the invention.

Referring to FIG. 1 showing the zoom lens according to the present embodiment, reference character F denotes a first lens unit (front lens unit) of positive refractive power. The first lens unit F is composed of two lens subunits, i.e., a first lens subunit F11 arranged to be stationary, and a second lens subunit F12 of positive refractive power used for focusing. Further, the first lens subunit F11 includes three separate lenses, i.e., a positive lens LP11f, a negative lens LN11 of bi-concave form, and a positive lens LP11r. Focusing from an infinitely distant object to a minimum-distance object is effected by moving the second lens subunit F12 toward the object side.

Reference character V denotes a variator of a negative refractive power used for the variation of magnification, serving as a second lens unit. The variation of magnification from the wide-angle end to the telephoto end is effected by moving the second lens unit V monotonically toward the image side on the optical axis. The image forming magnification of the second lens unit V changes within a range including unit magnification (−1×) during the variation of magnification.

Reference character C denotes a compensator of positive refractive power, serving as a third lens unit. The third lens unit C moves monotonically toward the object side on the optical axis so as to compensate for the shift of an image plane due to the variation of magnification.

Reference character SP denotes a stop, and reference character R denotes a relay lens unit of positive refractive power, serving as a fourth lens unit. Reference character G denotes a color separation prism or an optical filter, which is illustrated as a glass block in FIG. 1.

In general, in the four-unit zoom lens, the so-called front-lens focusing method in which focusing is effected by moving the whole first lens unit F disposed on the most object side has such a characteristic feature that, since the amount of drawing-out movement of the first lens unit F relative to one and the same object distance becomes fixed with respect to all the focal lengths, the structure of a lens barrel becomes simple.

However, in a zoom lens having a wide angle of view in which the first lens unit F has a positive refractive power, since, when focusing is effected on a minimum-distance object at the wide-angle end, the first lens unit F moves toward the object side, and the effective diameter of the first lens unit F increases so as to secure an off-axial light flux. Further, since the first lens unit F, which is relatively heavy, is moved for focusing, driving torque increases, so that it becomes difficult to perform rapid focusing.

Therefore, in the telephoto zoom lens according to the present embodiment, there is adopted, as mentioned in the foregoing, the inner focusing method in which focusing from as infinitely distant object to a minimum distance object is effected by moving the second lens subunit F12 toward the object side with the first lens subunit F11 remaining stationary, for the purpose of preventing an increase of the effective diameter of the first lens unit F, thereby reducing the size of the entire lens system and shortening the minimum object distance.

Further, with the first lens subunit F11 having such a construction as to have the positive lens LP11f, the negative lens LN11 of bi-concave form and the positive lens LP11r, it is possible to correct well spherical aberration, chromatic aberration, etc. Even if each of the positive lens LP11f, the negative lens LN11 and the positive lens LP11r is composed of a plurality of lens elements, the same advantageous effect as in the present embodiment can be obtained, as long as the positive lens LP11f, the negative lens LN11 and the positive lens LP11r are arranged in this order from the object side.

In addition, with the above-mentioned structure of the first lens subunit F11, the correction of chromatic aberration by the use of a positive lens and a negative lens can be performed at a plurality portions, so that it is possible to decrease the burden of achromatism. If the burden of achromatism is greatly increased, the radius of curvature of a lens becomes small, so that the lens becomes an effective lens in which the manufacturing tolerance thereof has a great influence on optical performance. As a result, the manufacturing tolerance in the radius of curvature of the lens, the lens thickness, the air separation, etc., becomes strict, so that there is a possibility that it becomes difficult to manufacture the lens. However, with the above-described construction of the first lens subunit F11, it is possible to prevent such an influence.

Further, the radius of curvature on the image side of the positive lens LP11f and the radius of curvature on the object side of the negative lens LN11 are made close to each other, and the radius of curvature on the image side of the negative lens LN11 and the radius of curvature on the object side of the positive lens Lp11r are made clost to each other. Thus, the positive lens LP11f, the negative lens LN11 and the positive lens LP11r are formed into such a structure as to be close to the cemented construction as much as possible. By this arrangement, it is possible to reduce the space through which an off-axial ray of light passes on the wide-angle side. Therefore, it is possible to also attain the compactness of a zoom lens, including the reduction of the diameter of the front lens element.

In addition, with the positive lens LP11f disposed on the object side of the negative lens LN11, the principal point of the whole first lens unit F is prevented from intruding into the inside of the first lens unit F, so that it is possible to attain a reduction in size of the whole zoom lens.

As described above, by appropriately setting the construction of the first lens unit F, it is possible to decrease the variation of the various aberrations, such as spherical aberration and chromatic aberration, caused by the variation of magnification and the focusing, and it is possible to lighten the burden of achromatism. Further, it is possible to attain the large aperture ratio, the high variable magnification ratio and high optical performance of a zoom lens adopting the inner focusing method.

In order to further attain a large aperture ratio, a high variable magnification ratio and high optical performance, according to the present embodiment, the various conditions are satisfied, as set forth in detail below.

First, the material to be used for each lens of the first lens unit F is taken into consideration so as to obtain extremely high optical performance.

In the present embodiment, the refractive index nd of the negative lens LN11 of the first lens subunit F11 relative to d-line (587.56 nm) is defined and expressed by the following condition (1), the Abbe number vp11f of the material of the positive lens LP11f of the first lens subunit F11 is defined and expressed by the following condition (2), and the Abbe number vp11r of the material of the positive lens LP11r of the first lens subunit F11 is defined and expressed by the following condition (3).

$$1.75 < nd \quad (1)$$

$$60 < vp11f \quad (2)$$

$$90 < vp11r \quad (3).$$

It is to be noted that, in a case where each of the negative lens LN11, the positive lens LP11f and the positive lens LP11r is composed of a plurality of lens elements, each of the values nd, vp11f and vp11r is a mean value. By setting the refractive index of the negative lens LN11 of the first lens subunit F11 relative to the d-line to such a high refractive index as indicated by the condition (1), it is possible to correct not only spherical aberration at the telephoto end but also offaxial aberration, such as curvature of field or distortion at the wide-angle side. If the negative lens LN11 of the material that does not satisfy the condition (1) is used, it becomes difficult to correct the above various aberrations. Further, by using, as the materials of the positive lens LP11f and the positive lens LP11r, materials whose Abbe numbers are high and whose dispersion is small as indicated by the conditions (2) and (3), it is possible to suppress the occurrence of longitudinal chromatic aberration. If the materials which do not satisfy the conditions (2) and (3) are used, it becomes difficult to suppress the occurrence of longitudinal chromatic aberration.

In addition, if the difference between Abbe numbers of a positive lens and a negative lens is small, when the first-order achromatism is effected by using the positive lens and the negative lens, as mentioned in the foregoing, the burden of achromatism by the positive lens and the negative lens increases rapidly, so that the radius of curvature becomes small rapidly. As a result, in some cases, the positive lens and the negative lens become the effective lens. However, by setting the difference between Abbe numbers of the positive lens and the negative lens large as indicated by the conditions (1), (2) and (3), it is possible to perform the first-order achromatism more easily, and it is possible to enlarge the radius of curvature. Accordingly, it is possible to prevent the lenses constituting the front lens element from becoming the effective lens.

In the meantime, as against the first-order achromatism, a lens with correction for chromatic aberration with respect to three wavelengths, including C-line (656.27 nm), F-line (486.13 nm), g-line (435.83 nm), etc., is called an apochromat. In order to attain the apochromat, it is necessary to use materials whose partial dispersion ratios are uniform, in addition to the first-order achromatism in which the correction of chromatic aberration is effected by setting the difference between Abbe numbers of the positive lens and the negative lens constituting the front lens element large.

Here, the partial dispersion ratio is the ratio of partial dispersion (n$\lambda$1−n$\lambda$2) for two arbitrary wavelengths $\lambda$1 and $\lambda$2 to principal dispersion (nF−nC).

If achromatism is effected for three rays, i.e., the C-line, the F-line and the g-line, a chromatic aberration curve becomes continuous, so that residual chromatic aberration becomes very small over the entire visible spectrum of 400 nm to 700 nm.

Then, in the negative lens included in the first lens subunit F11, the partial dispersion ratio Pg,d is limited as indicated by the following condition (4):

$$Pg,d < 1.36 - 0.00208 \times vn11 \quad (4)$$

provided that Pg,d=(ng−nd)/(nF−nC), where ng, nF and nC are the refractive indices of the negative lens relative to the g-line, the F-line and the C-line, respectively, and vn11 is the Abbe number of the negative lens.

By setting the partial dispersion ratio of the negative lens as indicated by the condition (4), it becomes possible to suppress the secondary spectrum of longitudinal chromatic aberration which is left over after the first-order achromatism. If the partial dispersion ratio of the negative lens is out of the range of the condition (4), it becomes difficult to suppress the secondary spectrum.

Further, in the second lens subunit F12 of the first lens unit F, the mean value vp12 of the Abbe numbers of the material of all positive lenses constituting the second lens subunit F12 is limited in such a way as to satisfy the following condition (5):

$$60 < vp12 \quad (5).$$

By this arrangement, it is possible to perform a first-order achromatism of the whole first lens unit F more easily, and it is possible to enlarge the radius of curvature, so that it is possible to prevent the first lens subunit F11 from becoming the effective lens. At the same time, the variation of longitudinal chromatic aberration due to focusing is suppressed. If the condition (5) is not satisfied, the first lens subunit F11 becomes the effective lens in some cases, and it becomes difficult to suppress the variation of longitudinal chromatic aberration.

Further, by making the second lens subunit F12 not include any negative lens for achromatism, it is possible to attain a light weight for the zoom lens and to attain rapid focusing.

As described above, by deciding the optical arrangement and limiting conditions of the first lens unit F and satisfying them, it is possible to obtain the so-called floating effect. According to the floating effect, an arbitrary air separation included in a lens unit that moves during focusing in response to a change of the object distance is enlarged or reduced according to the drawing-out movement of the lens unit, so that the angle or height at which a ray of light passes is changed so as to suppress the variation of aberration.

In addition, in the variable magnification method of a high variable magnification ratio as in the zoom lens according to the invention, the third lens unit C has a relatively large influence on the correction of longitudinal chromatic aberration during the variation of magnification, particularly, on the correction of longitudinal chromatic aberration on the telephoto side. Therefore, in the third lens unit C, the Abbe number of material of at least one positive lens among positive lenses constituting the third lens unit C is limited as indicated by the following condition (6):

$$70 < \nu p31 \qquad (6).$$

By this arrangement, the third lens unit is made to have an effect on the correction of longitudinal chromatic aberration on the telephoto side, so that it is possible to lighten the burden of achromatism of the first lens unit F.

In addition, in the present embodiment, when the focal length and F-number at the telephoto end of the zoom lens are denoted by fT and FNT, respectively, the size of a photographic effective image plane is denoted by IS, and the focal length of the first lens unit F is denoted by f1, the following conditions (7) and (8) are satisfied to attain a large-aperture telephoto zoom lens. Further, when the rate of change of the lateral magnification of the second lens unit V is denoted by Z2, and the zoom ratio of the zoom lens is denoted by Z, the following conditions (9) and (10) are satisfied to attain the appropriate power arrangement of a magnification varying portion.

$$55 < fT/IS \qquad (7)$$

$$1.0 < FN1 \qquad (8)$$

provided that FN1=f1/(fT/FNT)

$$10 < Z2 \qquad (9)$$

$$0.17 < Z2/Z \qquad (10).$$

As described above, the first lens unit F is composed of the first lens subunit F11 arranged to be stationary and the second lens subunit F12 is arranged to move for focusing, and the power arrangement of the zoom lens, the material of each lens and the sharing of the correction of aberration are appropriately set, so that it is possible to attain a decrease in the difficulty of manufacturing, a reduction in size and weight, and high speed focusing.

FIG. 2 is a table showing numerical data of the numerical example of a telephoto zoom lens according to the invention. In FIG. 2, ri denotes the radius of curvature of the i-th lens surface, when determined from the object side, di is the i-th lens thickness or air separation, when determined from the object side, and Ni and vi respectively denote the refractive index and the Abbe number of material of the i-th lens, when determined from the object side. In the present numerical example, the last two lens surfaces constitute a glass block, such as a face plate or a filter.

In the present numerical example, the zoom lens has a zoom ratio exceeding 66×. Surfaces r1 to r12 constitute a first lens unit F (focusing lens unit). Among the surfaces r1 to r12, surfaces r1 to r6 constitute a first lens subunit F11 (fixed lens subunit) arranged to be stationary during zooming and during focusing. Surfaces r7 to r12 constitute a second lens subunit F12 (moving lens subunit) having the focusing function. The first lens unit F has the function of forming an object point for a variator V, and the whole first lens unit F has a positive refractive power.

Surfaces r13 to r21 constitute the variator V, which contributes mainly to the variation of magnification. The variator V moves monotonically toward the image side during the variation of magnification from the wide-angle end to the telephoto end, and, in the middle of that movement, passes a point at which the image forming magnification is −1× (unit magnification).

Surfaces r22 to r33 constitute a compensator C, which has mainly the function of compensating for the shift of an image plane due to the variation of magnification and, also, has the magnification varying function. The compensator C has a positive refractive power, and moves monotonically from the wide-angle-end reference position toward the object side during the variation of magnification from the wide-angle end to the telephoto end. SP (r34) denotes a stop.

Surfaces r35 to r51 constitute a relay lens unit R, which has the image forming function. Surfaces r52 and r53 constitute a glass block which is equivalent to a color separation prism.

When, as an index for a telephoto zoom lens, the ratio of the focal length fT at the telephoto end of the entire zoom lens to the size IS of a photographic effective image plane is defined as "fT/IS", in the present numerical example, "fT/IS" becomes "60", because fT is "660" and IS is "11". In addition, Z2 is "12.2", and Z is "66".

Further, when, as an index for a large aperture ratio, the F-number of the first lens unit F is defined as "FN1=(fT/FNT)", in the present embodiment, FN1 becomes "1.185".

With regard to such a telephoto and large-aperture construction and the sharing of refractive power, in order to correct spherical aberration and longitudinal chromatic aberration, the first lens unit F has the correction of aberration shared by one positive lens, one negative lens and one positive lens which are included in the first lens subunit F11 (fixed lens subunit) and three positive lenses which are included in the second lens subunit F12 (moving lens subunit).

In general, it is preferable for the reduction in size of the entire zoom lens system, the power saving of a driving system, etc., that the first lens unit F is simple in lens construction as much as possible and has the block thereof constructed to be thin. Therefore, it is desirable that the number of constituent lens elements of the first lens unit F be made smaller, as much as possible.

On the other hand, as mentioned in the foregoing, the F-number FN1 of the first lens unit F has a value indicative of very high brightness, and, in addition, the sharing of refractive power of the front lens element is made large. Therefore, it becomes difficult to correct spherical aberration, longitudinal chromatic aberration, etc., due to zooming and focusing.

Accordingly, in the present numerical example, a negative lens whose material has a very high refractive index is made to be included in the first lens subunit F11 of the first lens unit F, and, at the same time, a positive lens whose material has a very large Abbe number is made to be also included in the first lens subunit F11. By this arrangement, the occurrence of spherical aberration and longitudinal chromatic aberration is suppressed. In this instance, each of the radius of curvature on the image side of the negative lens included in the first lens subunit F11 and the radius of curvature on the object side of the positive lens included in the first lens subunit F11 and disposed on the image side of the negative lens is set so very large as to be greater than 0.5 times the focal length at the telephoto end of the entire zoom lens, so that it is possible to relatively mitigate the difficulty of manufacturing. If each of the radius of curvature on the image side of the negative lens included in the first lens subunit F11 and the radius of curvature on the object side of the positive lens included in the first lens subunit F11 and disposed on the image side of the negative lens becomes less than 0.3 times or thereabout the focal length at the telephoto end of the entire zoom lens, the difficulty of manufacturing increases, so that there is a possibility of exceeding the precision limit in working lenses.

Further, the partial dispersion ratio of the first lens subunit F11 is set to "(ng−nd)/(nF−nC) =1.269".

Incidentally, refractive indices shown in the table of FIG. 2 are values obtained when the e-line is used as a ray of light. The value of the refractive index of the negative lens LN11 of the first lens subunit F11 obtained when the d-line is used as a ray of light is "nd=1.79952" (S-LAH52, OHARA).

Figure 3:
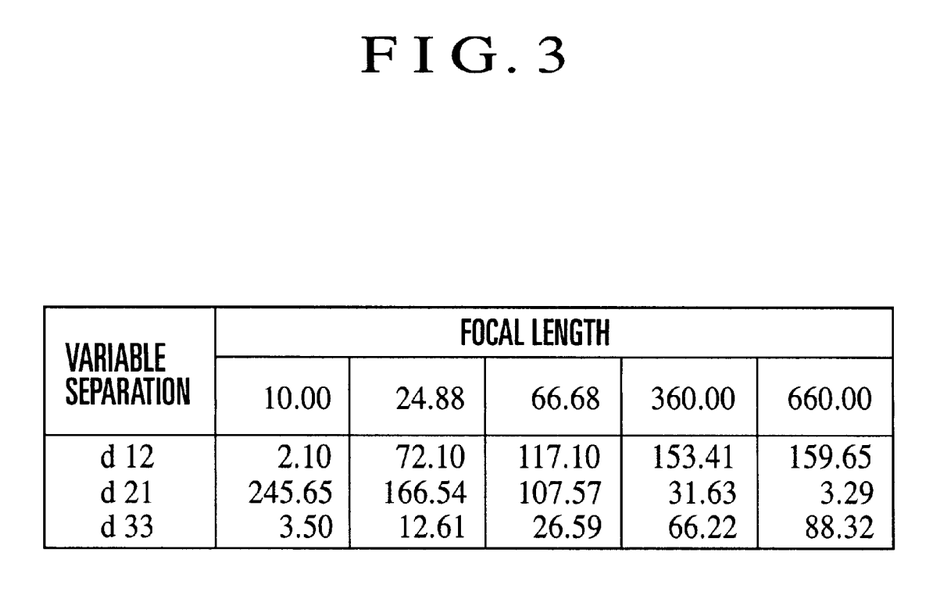
FIG. 3 is a table showing the relationship between the variable separation and the focal length in the numerical example of the invention.
Figures 4A, 4B:
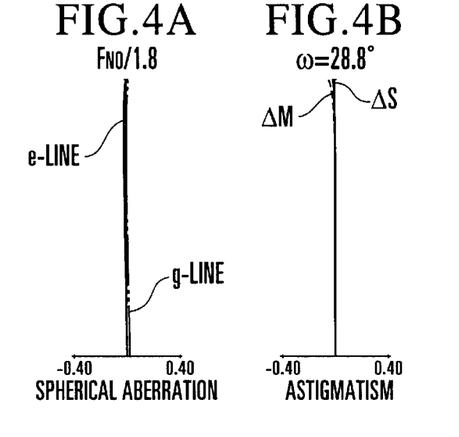
FIGS. 4A to 4D are aberration diagrams showing the various aberrations in the numerical example of the invention when the focal length f is 10.0 mm and the object distance is 12.0 m.
Figure 4C:
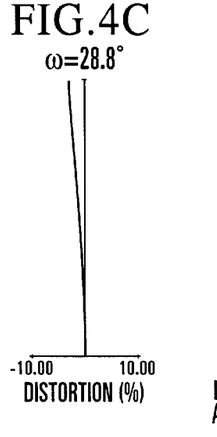
Figure 4D:
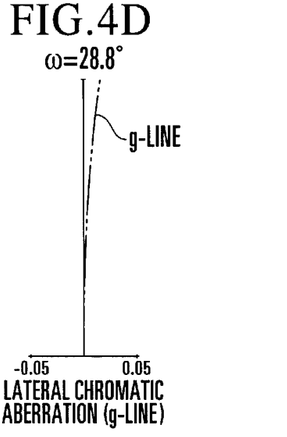
Figures 5A, 5B:
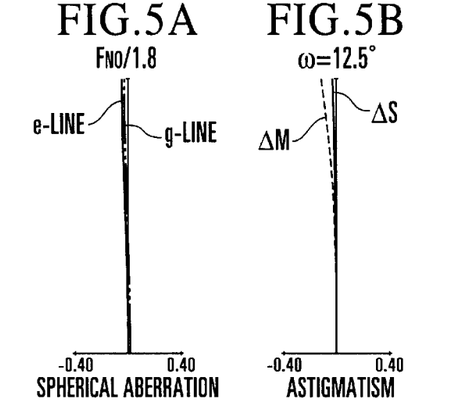
FIGS. 5A to 5D are aberration diagrams showing the various aberrations in the numerical example of the invention when the focal length f is 24.9 mm and the object distance is 12.0 m.
Figure 5C:
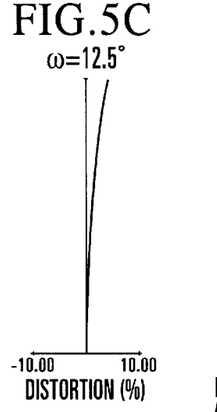
Figure 5D:
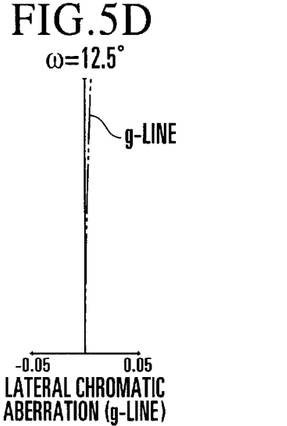
Figures 6A, 6B:
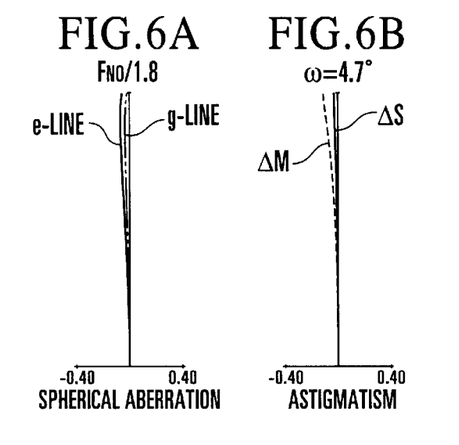
FIGS. 6A to 6D are aberration diagrams showing the various aberrations in the numerical example of the invention when the focal length f is 66.7 mm and the object distance is 12.0 m.
Figure 6C:
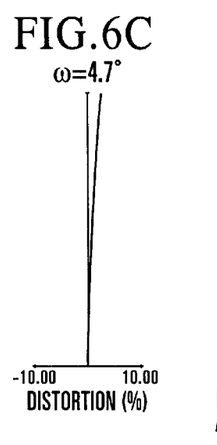
Figure 6D:
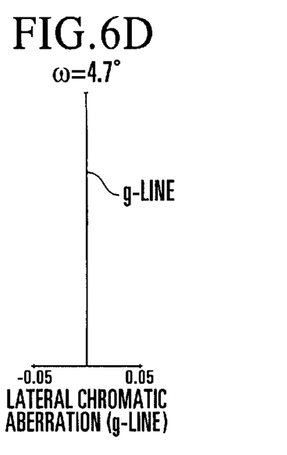
Figure 7A:
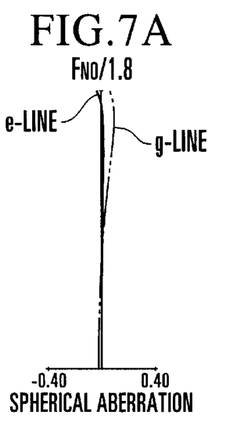
FIGS. 7A to 7D are aberration diagrams showing the various aberrations in the numerical example of the invention when the focal length f is 360.0 mm and the object distance is 12.0 m.
Figures 7B, 7C:
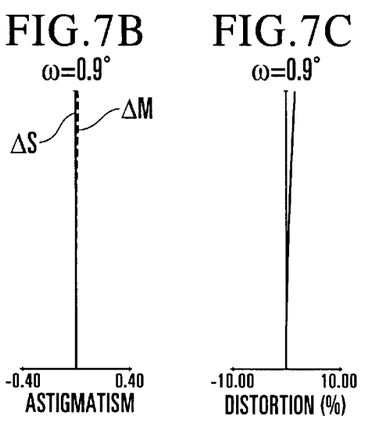
Figure 7D:
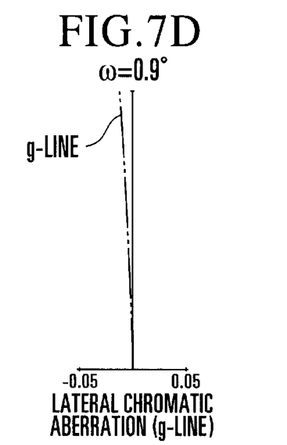
Figure 8A:
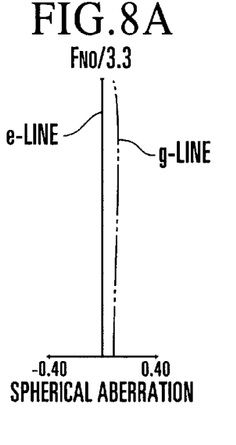
FIGS. 8A to 8D are aberration diagrams showing the various aberrations in the numerical example of the invention when the focal length f is 660.0 mm and the object distance is 12.0 m.
Figures 8B, 8C:
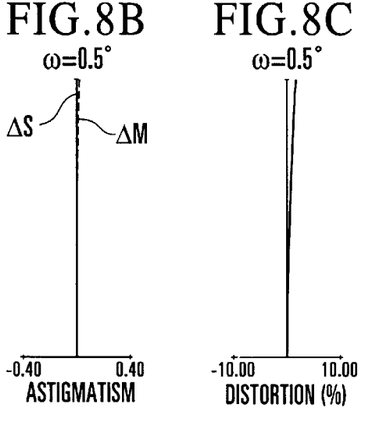
Figure 8D:
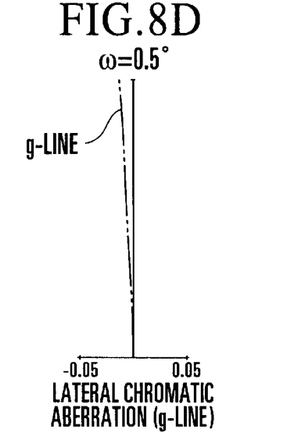

FIG. 3 is a table showing the relationship between each of the variable separations d12, d21 and d33 and each of the variable focal lengths according to the present numerical example. The focal length varies from "10.00" to "660.0".

FIGS. 4A to 4D through FIGS. 8A to 8D are aberration diagrams showing the various aberrations in the present numerical example of the telephoto zoom lens when the focal length is 10.00 mm, 24.88 mm, 66.68 mm, 360.00 mm and 660.00 mm, respectively.

Figure 9:
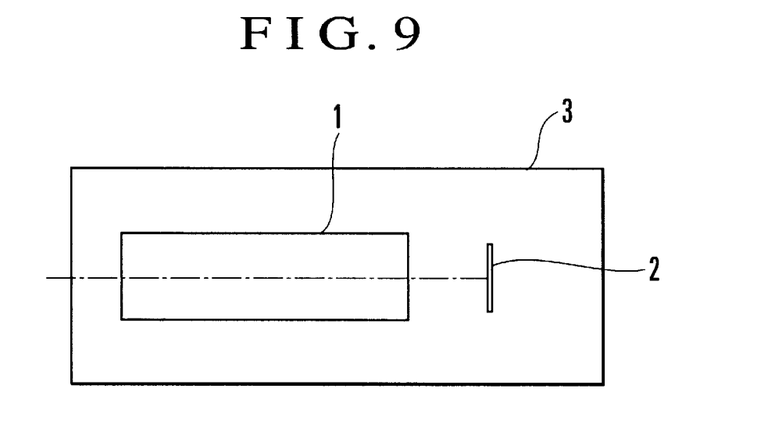
FIG. 9 is a schematic diagram showing a photographing apparatus having a zoom lens according to the invention.

Next, a photographing apparatus having a zoom lens as described above is shown in FIG. 9. In FIG. 9, reference numeral 1 denotes a photographing optical system in which the zoom lens according to the present embodiment is used, reference numeral 2 denotes a photoelectric conversion means, such as a CCD, and reference numeral 3 denotes a photographing apparatus body (casing). With the zoom lens according to the present embodiment applied to the photographing optical system 1 in the above manner, it is possible to realize a photographing apparatus having high optical performance.

As has been described above, according to the invention, in a four-unit zoom lens of the inner focusing type, the first lens unit is divided into a fixed lens subunit arranged to be stationary during focusing and a moving lens subunit arranged to move during focusing, and the arrangement of lens elements of the fixed lens subunit is appropriately set. Accordingly, it is possible to lessen the variation of spherical aberration and chromatic aberration due to the variation of magnification and focusing, and it is possible to lighten the burden of achromatism. Thus, it is possible to provide a large-aperture and high-variable-magnificationratio zoom lens having high optical performance over the entire variable magnification range and the entire focusing range.

What is claimed is:

1. A zoom lens comprising, in order from an object side to an image side:
   a first lens unit of positive refractive power;
   a second lens unit of negative refractive power arranged to move during a variation of magnification;
   a third lens unit arranged to move during a variation of magnification; and
   a fourth lens unit of positive refractive power,
      wherein said first lens unit includes a first lens subunit arranged to be stationary during focusing, and a second lens subunit of positive refractive power arranged to move during focusing, and
      wherein said first lens subunit includes, in order from the object side to the image side, at least one first positive lens, at least one negative lens of bi-concave form, and at least one second positive lens.

2. A zoom lens according to claim 1, wherein said zoom lens satisfies the following conditions:

$$1.75 < nd$$

$$60 < vp11f$$

$$90 < vp11r$$

where nd is the refractive index of said negative lens relative to the d-line, and vp11f and vp11r are Abbe numbers of said first positive lens and said second positive lens, respectively.

3. A zoom lens according to claim 1, wherein said zoom lens satisfies the following condition:

$$Pg,d < 1.36 - 0.00208 \times vn11$$

provided that $Pg,d=(ng-nd)/(nF-nC)$, where ng, nF and nC are refractive indices of said negative lens relative to the g-line, the F-line and the C-line, respectively, and vn11 is the Abbe number of said negative lens.

4. A zoom lens according to claim 1, wherein said zoom lens satisfies the following condition:

$$60 < vp12$$

where vp12 is a mean value of Abbe numbers of all positive lenses constituting said second lens subunit.

5. A zoom lens according to claim 1, wherein said second lens subunit consists of a plurality of positive lenses.

6. A zoom lens according to claim 1, wherein said zoom lens satisfies the following condition:

$$70 < vp31$$

where vp31 is the Abbe number of at least one positive lens among positive lenses constituting said third lens unit.

7. A zoom lens according to claim 1, wherein an image forming magnification of said second lens unit changes within a range including −1× during variation of magnification, said third lens unit has a positive refractive power, the image forming magnification of said third lens unit changes within a range including −1× during a variation of magnification, and said zoom lens satisfies the following conditions:

$$55 < fT/IS$$

$$1.0 < FN1$$

provided that $FN1=f1/(fT/FNT)$ $$10 < Z2$$

$$0.17 < Z2/Z$$

where fT and FNT are the focal length and F-number at a telephoto end of said zoom lens, respectively, f1 is the focal length of said first lens unit, IS is the size of a photographic effective image plane, Z is a zoom ratio of said zoom lens, and Z2 is a rate of change of lateral magnification of said second lens unit.

8. A photographing apparatus comprising:
   a zoom lens according to claim 1; and
   a casing holding said zoom lens.

* * * * *

UNITED STATES PATENT AND TRADEMARK OFFICE
CERTIFICATE OF CORRECTION

PATENT NO.    : 6,342,974 B1
DATED         : January 29, 2002
INVENTOR(S)   : Fumiaki Usui It is certified that error appears in the above-identified patent and that said Letters Patent is hereby corrected as shown below:

Column 1,
Line 15, "for the" should read -- of the --.

Column 2,
Line 26, "performance over the entire zooming range and" should be deleted.
Lines 27-40, should be deleted ("the entire … as products.").
Line 48, "application" should read -- Application --.
Line 56, "In" should be deleted.
Lines 57-61, should be deleted ("such lens surfaces … weight.").

Column 3,
Line 43, "iamge" should read -- image --.
Line 49, "focusing," should read -- focusing, and a second lens subunit of positive refractive power arranged to move during focusing, --.

Column 6,
Line 50, "Lp11r" should read -- LP11r -- and "clost" should read -- close --.

Column 7,
Line 37, "offaxial" should read -- off-axial --.

Column 11,
Line 41, "high-variable-magnificationratio" should read -- high-variable-magnification-ratio --.

Signed and Sealed this

Fifteenth Day of October, 2002

Attest:

JAMES E. ROGAN
Attesting Officer
Director of the United States Patent and Trademark Office